United States Patent [19]  
Oudet

[11] 3,958,139  
[45] May 18, 1976

[54] ELECTRIC MOTOR WITH BRIDGE-TYPE MAGNETIC CIRCUITS

[75] Inventor: Claude Oudet, Besancon, France

[73] Assignee: Societe de Recherches en Matiere de Micromoteurs Electriques, Besancon, France

[22] Filed: Dec. 4, 1974

[21] Appl. No.: 529,576

[30] Foreign Application Priority Data
Dec. 7, 1973  France .............................. 73.43645

[52] U.S. Cl. .............................. 310/49 R; 310/154; 310/181
[51] Int. Cl.² .................................... H02K 37/00
[58] Field of Search .................... 310/48, 152–156, 310/112, 114, 126, 181, 162–165

[56] References Cited
UNITED STATES PATENTS

| | | | |
|---|---|---|---|
| 3,456,138 | 7/1969 | Huber | 310/49 |
| 3,539,848 | 11/1970 | Stcherbatcheff | 310/156 |
| 3,553,508 | 1/1971 | Stcherbatcheff | 310/181 X |

*Primary Examiner*—Donovan F. Duggan  
*Attorney, Agent, or Firm*—Arthur V. Smith

[57] ABSTRACT

An improved electric motor having bridge-type magnetic circuits and including a magnetically permeable armature having first and second sets of salient rotor poles that are axially spaced apart and a permanent magnet stator structure. The stator structure includes a first pair of parallel magnetically permeable plates that are symmetrically disposed with respect to a first plane of symmetry and between which is interposed a first permanent magnet, the first plane of symmetry including the rotor axis. A second pair of parallel magnetically permeable plates is provided in symmetrical relation with respect to the first pair of plates and a second permanent magnet is interposed between the second pair of plates. The symmetry exhibited by the first and second pairs of plates is referenced to a second plane of symmetry that includes the rotor axis. The first and second pairs of plates define first and second sets of stator poles that are magnetically coupled with the first and second sets of salient rotor poles, respectively. The stator poles define surfaces that are symmetrically disposed with respect to and angularly displaced by 45° from the first and second planes of symmetry. An energizing coil is provided for generating a flux in response to the energization of the coil, such coil being disposed about and coaxial with the armature, intermediate the first and second sets of stator poles.

10 Claims, 4 Drawing Figures

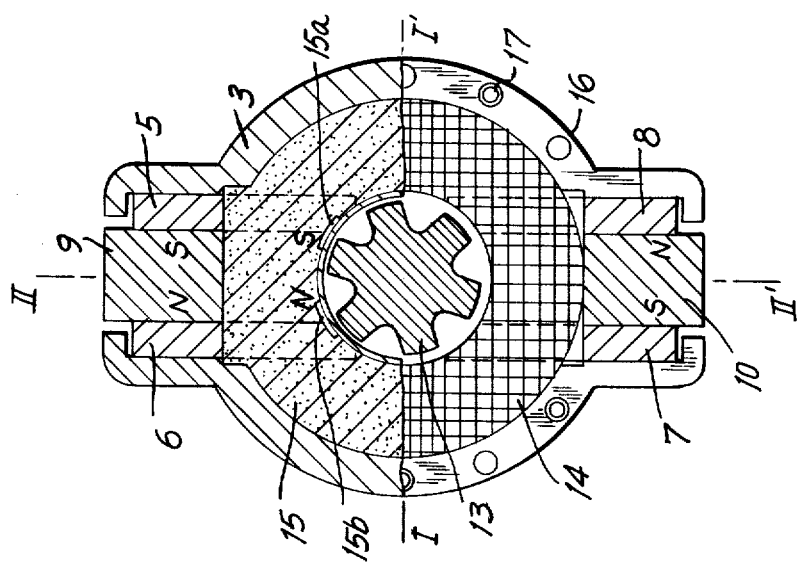
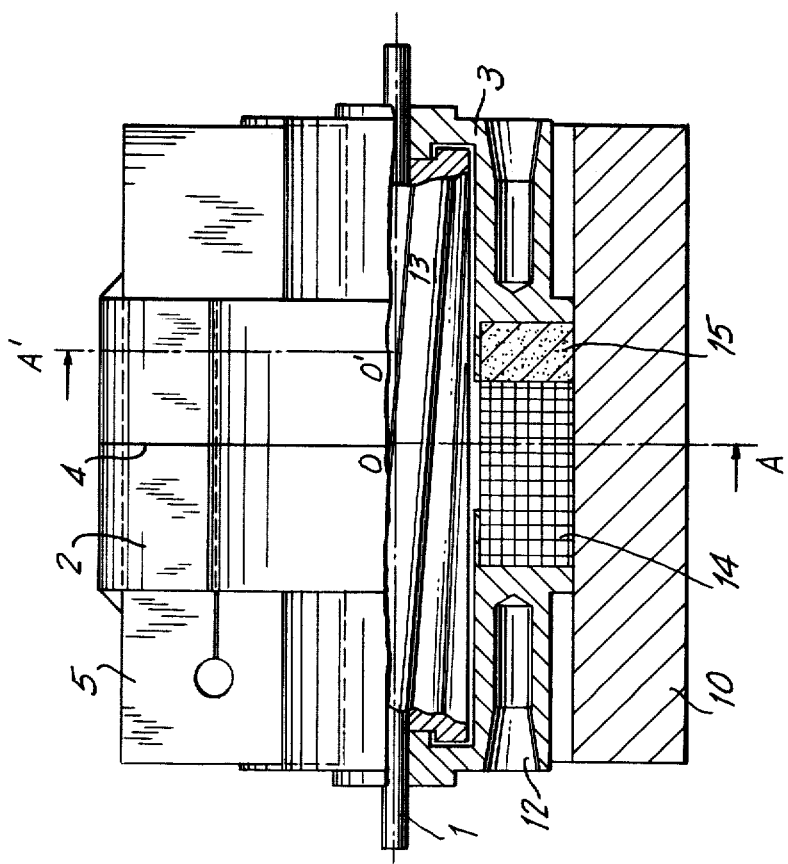

ELECTRIC MOTOR WITH BRIDGE-TYPE MAGNETIC CIRCUITS

BACKGROUND OF THE INVENTION

This invention relates to electric motors and, in particular, to an improved electric motor having bridge-type magnetic circuits.

A general type of synchronous motor includes a multipolar stator field, a source of alternating flux and a source of excitation flux. Many synchronous motors of this type exhibit significant magnetic losses which are undesirable. Such losses usually result in the development of relatively small torque, thus requiring increased flux generation.

To overcome many of the disadvantages of such synchronous motors, a motor has been proposed including a bridge-type magnetic circuit. Such motor comprises an elongated aramture, and a stator structure including a coil and having two pole pieces. Both the stator and rotor have salient poles which are arranged such that the opposite ends of the rotor are subjected to magnetic potentials derived from the stator magnet. These magnetic potentials vary sinusoidally in accordance with the angle of rotation of the rotor; and the variation of the potential at one end of the rotor is opposite in phase to the variation of the potential at the other end. Consequently, an alternating magnetic flux of zero average value passes through the rotor axis when the rotor rotates, independently of the flux produced by the coil. The flux from the coil is superposed in the axial direction of the rotor and passes through the stator plates of the stator structure, but without passing through the permanent magnet. In some motors of this type two such magnetic bridge circuits are connected in parallel.

In a further proposal for a synchronous motor having bridge-type magnetic circuits, the bridge-type magnetic circuits include pairs of radially disposed magnetically permeable plates. The radial plates are positioned about the rotor axis.

These prior bridge-type motor structures are generally expensive to manufacture and are relatively complex in design.

OBJECTS OF THE INVENTION

Therefore, it is an object of the present invention to provide a synchronous motor of a relatively simple and economical design. It is a further object of the present invention to provide a synchronous motor adapted for miniature construction, developing a comparatively high torque and being self-starting.

A still further object of the present invention is to provide a synchronous motor having minimal magnetic flux losses.

Another object of this invention is to provide an improved motor having a field coil wherein the resistive losses therein are small.

A further object of this invention is to provide a miniature synchronous motor adapted for a stepping operation when energized by unipolar current pulses that may be derived from chopped direct current.

Another object of this invention is to provide a miniature motor wherein the direction of rotation is determined by the design of the stator structure.

Various other objects and advantages of the invention will become clear from the forthcoming detailed description of exemplary embodiments thereof; and the novel features will be particularly pointed out in the appended claims.

SUMMARY OF THE INVENTION

In accordance with a preferred embodiment of the present invention, an improved electric motor having bridge-type magnetic circuits is provided including a magnetically permeable armature and having a stator structure comprising two pairs of parallel plates that are symmetrically disposed with respect to two planes of symmetry, each including the rotor axis. A permanent magnet is interposed between each pair of plates, and the plates define sets of salient stator poles which are spaced about the rotor axis and are magnetically coupled to the armature.

One feature of the invention, in certain important embodiments, is to provide an auxiliary stator member comprised of symmetrically disposed auxiliary stator poles that are angularly displaced with respect to the salient stator poles such that a stepping operation may be executed in response to the application of unipolar current pulses to an energizing coil.

BRIEF DESCRIPTION OF THE DRAWINGS

The forthcoming detailed description will best be understood by reference to the accompanying drawings in which:

FIG. 2 is a partially sectioned side view of the motor shown in FIG. 1;

FIG. 3 is a transverse sectional view of the motor shown in FIG. 1 taken along the lines A–O–O'–A' of FIG. 2; and FIG. 4 is a partial transverse sectional view of the motor depicted in FIG. 1 taken along the sectional lines A–O–O'–A' of FIG. 2 in accordance with another embodiment of the present invention.

DETAILED DESCRIPTION OF CERTAIN ONES OF THE PREFERRED EMBODIMENTS

Figure 1:
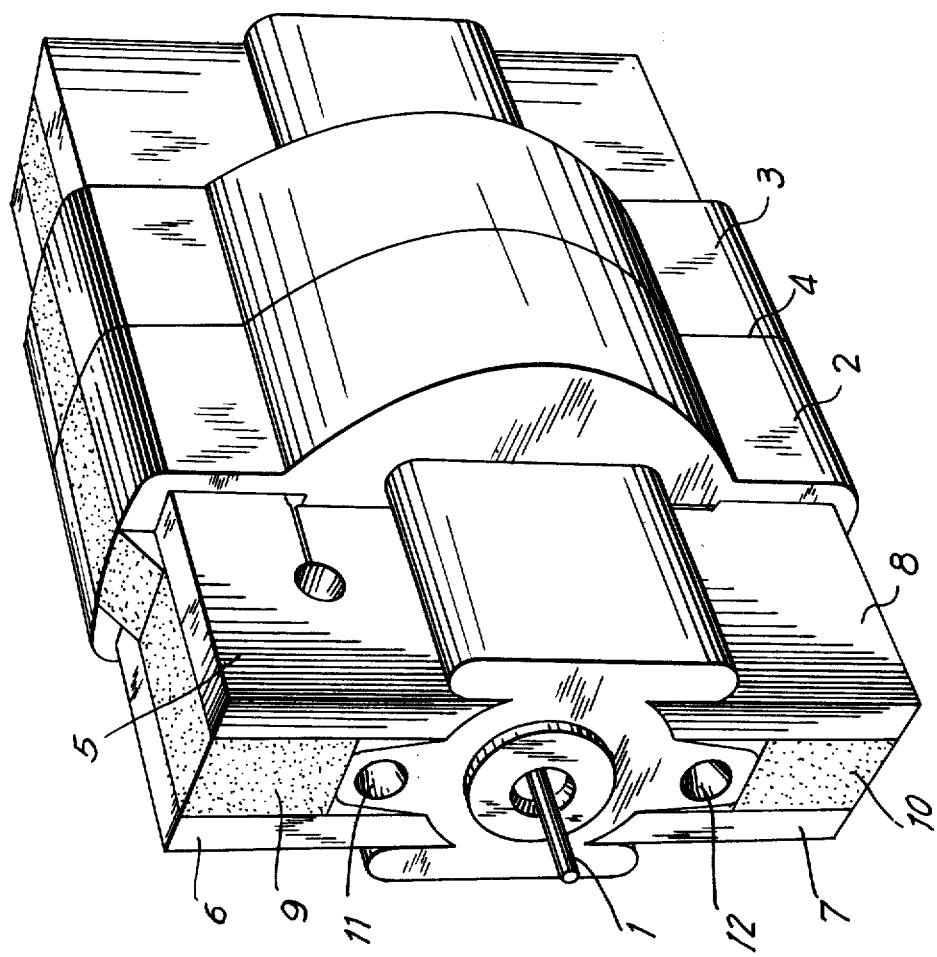
FIG. 1 is a perspective view of an electric motor in accordance with a preferred embodiment of the present invention.

Referring now to the drawings, wherein like referenced numerals are used throughout, and in particular to FIG. 1, a motor is depicted including an output shaft 1, a motor housing and a stator structure. The motor housing is comprised of two individual components 2 and 3, each made, for example, of a plastic material. These housing components surround portions of the stator structure, and substantially enclose the rotor to which the output shaft 1 is secured. The housing components 2 and 3 are joined at a median transverse plane 4.

When in the illustrated configuration, the housing components 2 and 3 are seen to include a generally cylindrical portion symmetrically disposed with respect to the median transverse plane and from which extend four substantially rectangular side members. The four side members may be considered as comprising two pairs of members, each pair having an integral joining portion that is positioned on the front and back surfaces of the motor when the motor is constructed as illustrated. The integral portion of the housing component 2 that is positioned on the front surface of the motor is provided with two fastening holes 11 and 12 to permit the fastening of various devices and components, not shown, to the motor. Similar fastening holes are provided on the integral portion of the housing component 3 that is positioned on the back surface of the motor. The housing components also include upstanding members which are adapted to receive the four plates designated 5, 6, 7 and 8. Further details of the motor housing will become apparent from the forthcoming description.

The four plates 5, 6, 7 and 8 included in the stator structure are formed of permeable magnetic material and are symmetrically disposed with respect to first and second perpendicularly aligned planes of symmetry, the intersection of such planes defining the rotor axis. As a typical example, and for the purpose of description, the first and second planes of symmetry may be considered as the horizontal and vertical planes, respectively, with respect to the motor structure illustrated in FIG. 1. Accordingly, the stator plates 5 and 6 may be considered as a first pair of plates symmetrically disposed with respect to the vertical plane; and, similarly, the stator plates 7 and 8 may be considered as a second pair of stator plates symmetrically disposed with respect to the vertical plane. The first and second pairs of stator plates are seen to be symmetrically disposed with respect to the horizontal plane. Permanent magnets 9 and 10 are interposed between the respective pairs of stator plates 5, 6 and 7, 8 as illustrated.

Referring now to FIGS. 2 and 3, the motor assembly in accordance with the present invention is depicted in partial sectional views. As may be observed, each of the stator plates, such as stator plate 5 shown in the upper portion of FIG. 2, which is a side view of that portion of the motor, is generally rectangular and includes a cut-out portion. The portion removed from the stator plate is also generally rectangular and results in a stator plate having a configuration that is substantially C-shaped. The opposite stator plates of the respective pairs, such as plates 5 and 8, are disposed in facing relation such that each C-shaped plate appears to lie on its side whereby the cut-out portions of the side plates, in cooperation with the motor housing components and the permanent magnets, define a central cavity adapted to receive further apparatus, described below.

In the sectional view provided in the lower half of FIG. 2, the motor armature 13 is depicted. The armature, which here comprises the rotor, includes an elongated member enclosed by a magnetically permeable cylindrical jacket. A plurality of salient rotor poles, or teeth, are provided uniformly about the periphery of the armature. In one typical embodiment, a set of six teeth are distributed about the rotor axis. These teeth, in the illustrated embodiment, are skewed with respect to the axis so that when two teeth at one end of the rotor face two stator poles of the same polarities, two teeth at the other end of the rotor face two stator poles of opposite polarities, whereby to eliminate any locking action between the rotor and the stator structure that might otherwise occur, to produce a continuous rotor surface and to reduce the fourth harmonics of the static torque without current. The skewing is recognized as introducing a tangential component into the pull between opposite teeth. In an alternative embodiment, the rotor teeth are not skewed, as illustrated, but comprise first and second sets of teeth at opposite ends of the rotor, the teeth of each set being disposed substantially parallel to the rotor axis, and the alignment of the teeth of one set being shifted with respect to the teeth of the other set by one-half of a step angle. For the example wherein each set is formed of six teeth, the sets are shifted with respect to each other by 30°. In assembly, the end portions of the armature, i.e. the first and second sets of salient rotor poles, cooperate with the stator structure, as will be described.

An energizing coil 14, known as the exciter winding, is generally annular or ring-shaped and is positioned within the cavity defined by the housing components 2 and 3, the cut-out portions of the stator plates 5, 6, 7 and 8 and the permanent magnets 9 and 10. The coil 14 is adapted to generate a flux in response to the supply of energizing current thereto. As is apparent, the coil is dipsosed about and coaxial with the armature 13 and is intermediate the end portions of the stator plates. Additionally, an auxiliary stator member 15 is likewise positioned within the aforenoted cavity and is disposed adjacent the coil 14 and in side-by-side relation therewith. The auxiliary stator member is also annular or ring-shaped, and coaxial with the armature 13.

The juxtaposition of the various elements comprising the stator structure and motor armature is illustrated in the sectional view of FIG. 3 taken along the section line A–O–O'–A', of FIG. 2. As illustrated in the upper portion of FIG. 3, that is, the portion above the horizontal plane I–I', the permanent magnet 9 is interposed between the substantially parallel stator plates 5 and 6. The permanent magnet admits of magnetic polarities such that a north pole (N) is adjacent the plate 6 and a south pole (S) is adjacent the plate 5. In a similar manner, the permanent magnet 10, interposed between the stator plates 7 and 8, is magnetized such that the south pole thereof is adjacent the plate 7 and the north pole is adjacent the plate 8. In this manner, stator plates of alternating magnetic polarity are disposed about the armature 13. Hence, each plate exhibits a magnetic polarity that is opposite to the magnetic polarity exhibited by the plates that are symmetrically disposed with respect thereto. For example, the stator plate 6 exhibits a north polarity (N) that is opposite to the south polarity (S) exhibited by the plates 5 and 7 that are symmetrically disposed with respect thereto.

The end portions of the respective stator plates, as viewed in FIGS. 2 and 3, that are juxtaposed with respect to the respective first and second sets of armature teeth, are provided with pole surfaces that are symmetrically disposed with respect to and angularly displaced by 45° from the horizontal (I–I') and the vertical (II–II') planes. Additionally, the pole surfaces are seen to lie in a common cylindrical plane that is coaxial with the armature 13. Hence, the median portion of each cylindrical pole surface is angularly displaced by 45° from the respective planes of symmetry of the motor. It may be appreciated that those portions of the stator plates that extend to the vicinity of the armature 13 and terminate in cylindrical pole surfaces thereby define first and second sets of salient stator poles, respectively, that are magnetically coupled with the corresponding first and second sets of armature teeth, the teeth forming air gaps with the polar surfaces of the stator plates.

The coil 14 is shown in section taken along line A–O of FIG. 2. The coil is seen to be disposed within the aforenoted cavity and the housing component 3 is also shown in a front view thereof taken along the median plane 4 of FIG. 1. The front surface of the component 3 is adjacent a corresponding surface of component 2 and, therefore, includes a plurality of mating holes 16 (FIG. 3) and protuberances, such as stubs, 17. The corresponding surface of the component 2 is likewise provided with similar mating holes and stubs. The mating holes 16 of the component 3 receive the corresponding stubs provided on the component 2, and similarly, the stubs 17 of the component 3 are received by the corresponding mating holes of the component 2. A proper assembly of the respective housing components may thus be readily effected to assure proper construction of the motor.

Also illustrated in section is the auxiliary stator member 15 which, in this embodiment, is made from isotropic magnetizable material such as an isotropic magnetic rubber (plastoferrite) or an iron-cobalt alloy. The auxiliary stator member is generally annular or ring-shaped having an inner surface that defines a cylindrical surface substantially coaxial with the armature 13. This cylindrical surface is substantially collateral with the cylindrical surface defined by the respective sets of salient stator poles formed of the stator plates. The auxiliary stator member is magnetized in such a way as to have four poles provided along generating line of this cylindrical surface. The four poles may be considered as first and second pairs of auxiliary stator poles that are magnetically coupled with one of the axially spaced apart sets of rotor teeth. The pole surfaces of these auxiliary stator poles are angularly displaced from the vertical plane of symmetry II–II' by approximately ±30°. That is, the median portion of a first auxiliary stator pole 15a is displaced, for example, by +30° from the vertical plane II–II'. Similarly, the median portion of a second auxiliary stator pole 15b is angularly displaced by approximately −30° from the vertical plane. In a corresponding manner, the remaining auxiliary stator poles, not shown, are angularly displaced from the vertical plane by approximately ±30°.

The respective auxiliary stator poles exhibit a magnetic polarity corresponding to the magnetic polarity exhibited by the salient stator pole that is closest thereto. For example, the auxiliary stator pole 15a is seen to be closest to the stator plate 5 and, therefore, exhibits a south polarity (S) identical to the magnetic polarity exhibited by the stator plate 5. Similarly, the auxiliary stator pole 15b is seen to be closest to the stator plate 6 and thus exhibits a corresponding north polarity (N) therewith.

Another exemplary embodiment of the motor in accordance with the present invention is illustrated in the partial sectional view of FIG. 4. In this embodiment, the auxiliary stator member is comprised of a magnetically insulating support disk 18, such as a plastic disk, in which are disposed a plurality of magnetic polar elements 19, only one of which is here shown. The plurality of magnetic polar elements are in the form of tooth-like pole pieces. Each tooth-like pole piece is made of a soft magnetic material and terminates in a polar surface having a position and configuration that corresponds to the position and configuration of the poles 15a, 15b . . . , previously described with respect to FIG. 3. The auxiliary stator member includes four tooth-like pole pieces arranged in first and second pairs of pole pieces. The pole faces of these pole pieces are symmetrically disposed in a cylindrical surface coaxial with the armature and collateral with the cylindrical surface defined by the stator plates. As in the FIG. 3 embodiment, the median portions of the auxiliary stator pole faces are angularly displaced from the vertical plane of symmetry II–II' by approximately ±30°. The end portion of each tooth-like pole piece that is remote from the pole surface thereof is magnetically coupled to the one stator plate that is closest thereto. Thus, each tooth-like pole piece 19 exhibits a magnetic polarity corresponding to the magnetic polarity exhibited by the salient stator pole that is closest thereto. In this manner, the aforedescribed magnetic configuration depicted in FIGS. 2 and 3 exists in the embodiment represented by FIG. 4; and the auxiliary stator pole pieces are magnetically coupled with one set of the axially spaced apart armature teeth.

The magnetic bridge circuits formed by the motor armature 13, the stator plates 5, 6, 7 and 8 and the permanent magnets 9 and 10 of the motor described hereinabove permits this motor to operate as a single phase synchronous motor in accordance with the energizing current supplied to the coil 14. However, by reason of the auxiliary magnetic structure as described in the foregoing exemplary embodiments of the auxiliary stator member, the illustrated motor is readily adapted for a stepping operation in accordance with current pulses applied to the coil 14. The direction of rotation of the armature 13 is dependent upon the polarity exhibited by such energizing current pulses. The current pulses are all of the same polarity to effect rotation in a determined direction.

In an alternative embodiment of the present invention, the illustrated motor may be readily adapted for unidirectional rotation by displacing the plane of symmetry of the auxiliary magnetic structure approximately 1° to 10°. This results in an effective rotation of the auxiliary stator poles. The direction of rotation of the armature 13 will be opposite to the direction of rotation of this plane of symmetry. Thus, if the auxiliary stator poles are rotated about the rotor axis by approximately 1° to 10° in the clockwise direction, the armature 13 will rotate in the counterclockwise direction. Conversely, if the auxiliary stator poles are rotated about the rotor axis in the counterclockwise direction, the armature 13 will rotate in the clockwise direction.

As a still further embodiment, the auxiliary stator member can be comprised of three pairs of poles. When used with, for example, a rotor having sets of six teeth each, one pair of poles would be magnetically opposite to the stator poles 5, 6 or 7, 8.

In accordance with the present invention, the construction of the synchronous or stepping motor may be significantly simplified by utilizing the auxiliary stator member described hereinabove. Advantageously, the stator poles may be formed to have the same shape and to have symmetrical pole surfaces.

While the invention has been particularly shown and described with reference to a plurality of exemplary embodiments thereof, it will be obvious to those skilled in the art that various changes and modifications in form and detail may be made without departing from the spirit and scope of the invention. It is therefore intended that the appended claims be interpreted as including all such changes and modifications.

What is claimed is:

1. In an electric motor having bridge-type magnetic circuits and including an armature formed of magnetically permeable material and disposed for rotation about an axis, the armature including first and second sets of rotor poles, the first and second sets being axially spaced apart; and a permanent magnet stator structure; the improvement comprising:

first and second parallel magnetic members symmetrically disposed with respect to a first plane of symmetry and exhibiting north and south magnetic polarities, respectively, said first plane of symmetry including the rotor axis, said first and second magnetic members terminating in salient stator poles magnetically coupled with said first and second sets of rotor poles, respectively;

third and fourth parallel magnetic members symmetrically disposed with respect to said first plane of symmetry and exhibiting north and south magnetic polarities, respectively, said first and second, and third and fourth members being symmetrically disposed with respect to a second plane of symmetry, said second plane of symmetry including said rotor axis, said first, second, third and fourth members exhibiting alternating polarities; said third and fourth magnetic members terminating in salient stator poles magnetically coupled with said first and second sets of rotor poles, respectively;

the salient stator poles defined by said first, second, third and fourth members having pole surfaces that are spaced apart by 90° and angularly displaced from said first and second planes of symmetry by 45°; and a coil for generating a flux in response to the energization thereof, said coil being magnetically coupled to all of said salient stator poles.

2. The improvement of claim 1 wherein said first, second, third and fourth parallel magnetic members comprise first, second, third and fourth parallel magnetically permeable plates, respectively, and having first and second permanent magnets interposed between said first and second plates and said third and fourth plates, respectively, such that each plate exhibits a magnetic polarity that is opposite to the magnetic polarity exhibited by the plates that are symmetrically disposed with respect thereto.

3. In an electric motor having bridge-type magnetic circuits and including an armature formed of magnetically permeable material and disposed for rotation about an axis, the armature including first and second sets of rotor poles, the first and second sets being axially spaced apart; and a permanent magnet stator structure; the improvement comprising:

a first pair of parallel magnetic members symmetrically disposed with respect to a first plane of symmetry and exhibiting opposite magnetic polarities, said first plane of symmetry including the rotor axis;

a second pair of parallel magnetic members symmetrically disposed with respect to said first plane of symmetry and exhibiting opposite magnetic polarities, said first and second pairs of members being symmetrically disposed with respect to a second plane of symmetry, said second plane of symmetry including said rotor axis;

said first and second pairs of parallel magnetic members being arranged so that each member exhibits a magnetic polarity that is opposite to the magnetic polarity exhibited by the members that are symmetrically disposed with respect thereto;

said first and second pairs of members including portions that define at least first and second sets of salient stator poles, said first and second sets of salient stator poles being magnetically coupled with said first and second sets of rotor poles, respectively, and having pole surfaces that are symmetrically disposed with respect to and angularly displaced from said first and second planes of symmetry;

a magnetic auxiliary stator member comprised of first and second pairs of auxiliary stator poles that are magnetically coupled with one set of said rotor poles; said auxiliary stator poles defining symmetrical pole surfaces that are disposed in a cylindrical surface coaxial with said armature, the pole surfaces being angularly displaced from said first plane of symmetry by approximately ±30°; each auxiliary stator pole exhibiting a magnetic polarity corresponding to that exhibited by the salient stator pole that is closest thereto; and a coil for generating a flux in response to the energization thereof, said coil being magnetically coupled to the first and second sets of salient stator poles.

4. The improvement of claim 3 wherein each of said first and second axially spaced apart sets of rotor poles consists of six salient rotor poles.

5. The improvement of claim 4 wherein said first and second pairs of parallel magnetic members comprise first and second pairs of parallel magnetically permeable plates, and each magnetically permeable plate is substantially C-shaped such that said first and second sets of salient rotor poles are defined at the opposite outer portions of the C-shaped plates and the inner portions of the C-shaped plates receive said coil and said auxiliary stator member.

6. The improvement of claim 5 wherein said auxiliary stator member is formed of an isotropic magnetizable material.

7. The improvement of claim 2 further including an auxiliary stator member comprised of first and second pairs of tooth-like pole pieces formed of magnetically permeable material, said first and second pairs of auxiliary stator pole pieces magnetically coupling the first and second permanent magnets with one set of said rotor poles; each of said auxiliary stator pole pieces having a first portion in magnetic communication with a permanent magnet and a second portion defining a pole surface; the first and second pairs of auxiliary stator pole surfaces being symmetrically disposed in a cylindrical surface coaxial with said armature wherein the pole surfaces are angularly displaced from said first plane of symmetry by approximately ±30°; each auxiliary stator pole piece exhibiting a magnetic polarity corresponding to that exhibited by the salient stator pole that is closest thereto.

8. The improvement of claim 7 wherein each of said first and second axially spaced apart sets of rotor poles consists of six salient rotor poles.

9. The improvement of claim 8 wherein each magnetically permeable plate is substantially C-shaped such that said first and second sets of salient rotor poles are defined at the opposite outer portions of the C-shaped plates and the inner portions of the C-shaped plates receive said coil and said auxiliary stator member.

10. The improvement of claim 1 further including an auxiliary stator member comprised of first and second pairs of auxiliary stator poles that are magnetically coupled with one set of said rotor poles and that define symmetrical pole surfaces that are disposed in cylindrical surface coaxial with said armature, the pole surfaces being angularly displaced by approximately ±30° from a plane that is rotated by an angle of from 1° to 10° with respect to said first plane of symmetry, the direction of angular rotation being opposite to the desired direction of rotation of said armature; each of said auxiliary stator poles exhibiting a magnetic polarity corresponding to that exhibited by the salient stator pole that is closest thereto.

* * * * *